US008508133B2

(12) United States Patent
Tominaga et al.

(10) Patent No.: US 8,508,133 B2
(45) Date of Patent: Aug. 13, 2013

(54) HEADLAMP ASSEMBLY

(75) Inventors: Motonori Tominaga, Anjo (JP); Syogo Kume, Takahama (JP); Tsutomu Kamizono, Nagoya (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 175 days.

(21) Appl. No.: 13/066,335

(22) Filed: Apr. 12, 2011

(65) Prior Publication Data

US 2011/0254446 A1 Oct. 20, 2011

(30) Foreign Application Priority Data

Apr. 14, 2010 (JP) ................................. 2010-093161

(51) Int. Cl.
*B60Q 1/04* (2006.01)
*F21V 7/00* (2006.01)

(52) U.S. Cl.
USPC ............................................ 315/82; 362/539

(58) Field of Classification Search
USPC .................... 315/82; 362/539, 516, 538, 547
See application file for complete search history.

(56) References Cited

U.S. PATENT DOCUMENTS

| | | | | |
|---|---|---|---|---|
| 7,762,696 | B2 * | 7/2010 | Wan et al. | 362/373 |
| 2003/0058656 | A1 | 3/2003 | Yamaguchi | |
| 2007/0076422 | A1 * | 4/2007 | Nicolai | 362/547 |
| 2009/0262549 | A1 | 10/2009 | Inoue et al. | |

FOREIGN PATENT DOCUMENTS

| | | |
|---|---|---|
| CN | 101566301 | 10/2009 |
| JP | 2003-068134 | 3/2003 |
| JP | 2005-190825 | 7/2005 |
| JP | 2006-107875 | 4/2006 |
| JP | UM 3133586 | 6/2007 |
| JP | 2007-242267 | 9/2007 |
| JP | 2008-059965 | 3/2008 |
| JP | 2008-123836 | 5/2008 |
| JP | 2008-130232 | 6/2008 |
| JP | 2008-277237 | 11/2008 |
| JP | 4289268 | 4/2009 |
| JP | 2009-129642 | 6/2009 |

(Continued)

OTHER PUBLICATIONS

Office action dated Mar. 13, 2012 in corresponding Japanese Application No. 2010-093161.

(Continued)

*Primary Examiner* — Daniel D Chang
(74) *Attorney, Agent, or Firm* — Harness, Dickey & Pierce, PLC

(57) ABSTRACT

In a light chamber formed in a housing case and a lens cover placed at a front part of the housing case in a headlamp assembly, a projection lens, a shade and a light source are arranged in line from the front side of the light chamber along an optical axis of the light source. A radiating member has radiating fins of a plate shape vertically placed in the light chamber, and radiates heat energy generated by the light source to surrounding air. A slit composed of a vertical slit part and an inclined-slit part is formed in each of the radiating fins. The formation of the slit generates a change of heat capacity and a temperature difference at upper and bottom parts of each of the radiating fins. The incline-slit part is extended from the top of the vertical slit part to the upper part of the radiating fin.

15 Claims, 10 Drawing Sheets

(56) References Cited

FOREIGN PATENT DOCUMENTS

| | | |
|---|---|---|
| JP | 2009-147175 | 7/2009 |
| JP | 2009-212019 | 9/2009 |
| JP | 2010-021087 | 1/2010 |
| JP | 2010-080075 | 4/2010 |
| WO | WO 2009/144024 | 12/2009 |

OTHER PUBLICATIONS

Office Action issued Dec. 18, 2012 in corresponding Chinese Application No. 2011 10096204.6 with English translation.

Office Action dated May 21, 2013 in corresponding Japanese Application No. 2012-100063 with English translation.

* cited by examiner

HEADLAMP ASSEMBLY

CROSS-REFERENCE TO RELATED APPLICATION

This application is related to and claims priority from Japanese Patent Application No. 2010-093161 filed on Apr. 14, 2010, the contents of which are hereby incorporated by reference.

BACKGROUND OF THE INVENTION

1. Field of the Invention

The present invention relates to headlamp assemblies for motor vehicles, equipped with one or more radiating members capable of radiating heat energy generated by one or more light sources.

2. Description of the Related Art

There are various types of headlamp assemblies mounted to motor vehicles equipped with light emitting diodes. For example, Japanese patent No. JP4289268 has disclosed such a headlamp assembly comprised of a headlamp and a light emitting diode. In the headlamp assembly, a light projection lens, a shade and a light source are arranged in turn, and a reflector is arranged so that it faces the light source. The reflector reflects the light generated by the light source to the forward direction. One or more radiating members are mounted to the light source in order to radiate the heat energy generated in the light source.

In the headlamp assembly, the light source is comprised of a first light source and a second light source. The first light source has a first light emission part which is vertically placed at an upper part observed from an optical axis of the light source. The second light source has a second light emission part which is vertically placed at a lower part observed from the optical axis of the light source. That is, the headlamp assembly generates two types of light beam patterns.

In general, a light emitting diode has an intrinsic drawback because of having a high heat density. For example, when the temperature of a light emitting diode increases, the light emitting efficiency is decreased, and its lifetime becomes short. Therefore, when light emitting diodes are closely arranged to each other and a small sized radiating member is used for decreasing the entire size of the headlamp assembly, the heat generation density becomes high and the heat radiating capability of the headlamp assembly is decreased.

In order to avoid the above conventional drawback, there are conventional techniques. For example, Japanese patent laid open publication No. JP 2005-190825 has disclosed such a conventional technique in which a headlamp assembly is equipped with an electric fan. The electric fan makes air flow from the rear side of a lamp chamber to the front side of the lamp chamber. Thus, the electric fan forcedly makes the heated air flow from the rear side of the lamp chamber toward the front side of the light chamber in order to cool the inside of the light chamber.

Further, Japanese patent laid open publication No. JP 2009-147175 has disclosed another conventional technique in which a coolant flows through a cooling pipe in a printed circuit board on which one or more light emitting diodes are arranged in order to cool the light emitting diodes, and the coolant is supplied by a pump to the radiating plate through the cooling pipe in order to radiate heat energy from the radiating plate. This conventional technique increases the heat radiating capability.

However, the conventional techniques previously described require an electric fan in a lamp chamber and/or a pump and a cooling pipe in order to forcedly cool the light emitting diodes. This increases the entire size of the headlamp assembly, and electric power consumption because the conventional headlamp assemblies further need to have additional electric power in order to drive the above electric fan and pump.

SUMMARY OF THE INVENTION

It is an object of the present invention to provide a headlamp assembly for vehicles with increased radiating capability without increasing the size and electric power consumption of the headlamp assembly.

To achieve the above purposes, the present invention provides a headlamp assembly for a motor vehicle. The headlamp assembly is comprised of a housing case, a front part of the housing case is open, a lens cover, a light source, a shade, a projection lens, a radiating member, and a projection lens. The lens cover is fitted to the front part of the housing case. The lens cover and the housing case form a light chamber. The light source is placed in the light chamber and emits light. The reflector is placed in the light chamber. The reflector reflects the light emitted from the light source toward a front direction of the headlamp assembly. The reflector is placed at a rear position of the light source and partially surrounding the light source. The shade is placed in the light chamber. The shade cuts off a part of the light reflected by the reflector. The projection lens is placed in the light chamber, and projects the light reflected by the reflector toward the front direction of the headlamp assembly through the lens cover. The radiating member is comprised of a plurality of radiating fins placed in the light chamber at a right angle to a bottom wall side of the housing case. Each of the radiating fins has a plate shape. An upper part and a bottom part of each of the radiating fins have a different heat capacity with which different heat energy is conducted, and heat energy generated by the light source is radiated through the radiating fins. The projection lens, the shade, and the light source are arranged in a line from the front end of the headlamp assembly along an axial direction of the light source.

It is possible to form a slit in a bottom part of each of the radiating fins in order for the upper part and the bottom part of each of the radiating fins to have a different heat conduction of conducting heat energy.

It is possible for the radiating member to further have a vertical plate placed in the light chamber at a right angle to the bottom wall of the housing case, and the radiating fins fixed at a predetermined interval onto a surface of the vertical plate so that the radiating fins are placed in parallel to a direction from the bottom wall to the ceiling wall of the housing case. The slit is composed of a vertical slit part and an inclined slit part. The vertical slit part is extended from the bottom part toward the upper part of the radiating fins, and the inclined slit part is extended from a top part of the vertical slit part toward the upper part of the radiating fin along an inclined direction.

It is possible for each of the radiating fins to be made of a thin plate.

It is also possible for an upper part of each of the radiating fins to be thicker than a bottom part thereof in order to have a different heat capacity with which a different quantity of heat energy is conducted in the upper part and the bottom part of each of the radiating fins.

It is possible for each of the radiating fins to be made of a thin plate. The upper part has a stack structure in which the thin plate is bent 180 degrees and the ends overlapped together so that the upper part is thicker than the bottom part of each of the radiating fins.

It is possible for each of the radiating fins to have a difference in level (or to make a difference level) so that the upper part is thicker than the bottom part thereof.

It is also possible to further have a mount member through which the light source is fixed to the radiating member, and a drive circuit for driving the light source is placed in the mount member.

It is also possible to further have a plurality of the radiating members. Each of the radiating members is fixed onto the surface of the mount member.

It is possible for the drive circuit to be placed in the mount member apart from the light source.

In the headlamp assembly for vehicles according to the present invention, because the upper part and the bottom part of each of the radiating fins have a different heat capacity, the upper part and the bottom part of the radiating fin have a different temperature when the light source works. Such a structure of the radiating fins increases the flow speed of air in the gap between the adjacent radiating fins without increasing the entire size and electric power consumption of the headlamp assembly. As a result, the structure of the radiating fins increases the radiating capability of the headlamp assembly.

Further, because the slit is formed at the bottom part in each of the radiating fins, it is possible for the upper part and the bottom part to have a different heat conductance and heat capacity with a simple structure.

Still further, because the upper part and the bottom part of the radiating fin have a different thickness so that the upper part is thicker than the bottom part, it is possible for the upper part and the bottom part to have a different heat conductance and heat capacity with a simple structure. Still further, because a difference in level is formed on the surface of each of the radiating fins, turbulence is generated in the flow of air which rises in the gap between the adjacent radiating fins. This makes it possible to further increase the radiating capability of the radiating member. Because the drive circuit is placed in the mount member, it is possible to radiate the heat energy generated in the drive circuit through the radiating member.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
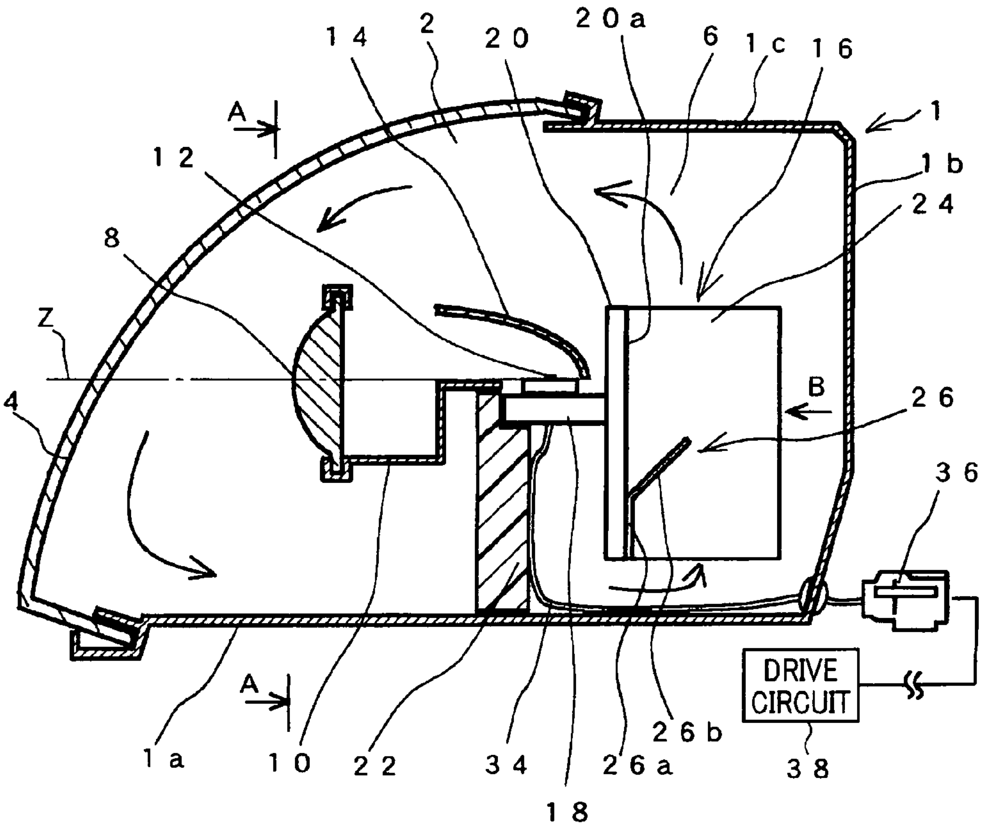
FIG. 1 is a schematic view showing a vertical cross section of a headlamp assembly mounted to a vehicle according to a first embodiment of the present invention.

Hereinafter, various embodiments of the present invention will be described with reference to the accompanying drawings. In the following description of the various embodiments, like reference characters or numerals designate like or equivalent component parts throughout the several diagrams.

First Embodiment

A description will now be given of the headlamp assembly according to the first embodiment of the present invention with reference to FIG. 1 to FIG. 6.

Figure 2:
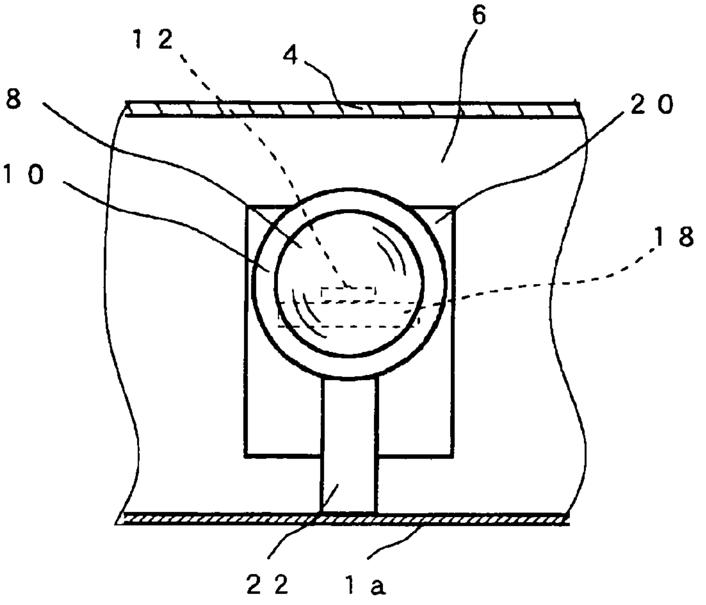
FIG. 2 is a view showing a cross section of the headlamp assembly along the A-A line shown in FIG. 1.
Figure 3:
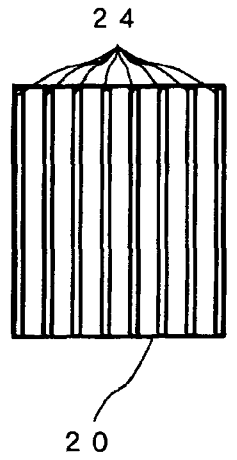
FIG. 3 is a view showing a cross section of a radiating member composed of a plurality of radiating fins in the headlamp assembly when observed from the rear side designated by the arrow B shown in FIG. 1.

FIG. 1 is a schematic view showing a vertical cross section of a headlamp assembly mounted to a vehicle according to a first embodiment of the present invention. FIG. 2 is a view showing a cross section of the headlamp assembly along the A-A line shown in FIG. 1. FIG. 3 is a view showing a cross section of the radiating member composed of a plurality of the radiating fins 24 in the radiating member of the headlamp assembly when observed from the rear side designated by the arrow B shown in FIG. 1.

As shown in FIG. 1, the headlamp assembly according to the first embodiment is comprised of a housing case 1, a front lens cover 4 and other various types of components. A front part 2 of the housing case 1 is open. The front lens cover 4 is fitted and fixed to the front part 2 of the housing case 1 in order to approximately close the inside of the housing case 1. That is, the housing case 1 and the front lens cover 4 makes a light chamber 6. The light chamber 6 accommodates the various types of components In the light chamber 6, a projection lens 8, a shade 10 and a light source 12 are arranged in line along the optical axis Z when observed from the front side toward the rear side of the headlamp assembly. A reflector 14 faces the light source 12. The reflector 14 reflects the light emitted from the light source 12.

In the structure of the headlamp assembly according to the first embodiment, the projection lens 8 is composed of a plane concave lens. The projection lens 8 and the reflector 14 are arranged in the housing case 1 so that they have approximately the same focal point. The reflector 14 has an inner reflection surface having a curved surface such as a rotational parabolic surface. The shade 10 cuts off a part of the light reflected by the reflector 14. The remained part of the light reflected by the reflector 14 is irradiated by the projection lens 8 to the front of the headlamp assembly. As shown in FIG. 2, the shade 10 further acts as a supporting member capable of supporting the projection lens 8 in the structure of the headlamp assembly according to the first embodiment.

The light source 12 is equipped with a light emitting diode (LED). The light source 12 is mounted and fixed to a horizontal plate 18 of a radiating member 16.

The horizontal plate 18 has a plane shaped plate and placed in a horizontal direction in the headlamp assembly. A vertical plate 20 of the radiating member 16 is placed at the rear side of the horizontal plate 18. The horizontal plate 18 and the vertical plate 20 are assembled together.

The vertical plate 20 is approximately at a right angle to the optical axis Z of the light source 12. The vertical plate 20 is vertically placed in the headlamp assembly according to the first embodiment.

The horizontal plate 18 is fixed approximately at the central part of the vertical plate 20.

The front end of the horizontal plate 18 is fixed to a supporting member 22 which is vertically placed and fixed to the bottom wall 1*a* of the housing case 1. The rear end of the shade 10 is fixed to the supporting member 22.

A gap is formed between the bottom side of the vertical plate 20 and the bottom wall 1*a* of the housing case 1. This gap allows the air to adequately flow and circulate in the headlamp assembly. Further, a gap between the upper side of the vertical plate 20 and the ceiling wall 1*c* of the housing case 1. This gap also allows the air to adequately flow and circulate in the headlamp assembly. The horizontal plate 18 and the vertical plate 20 are made of material with high heat conductivity, for example, aluminum.

As shown in FIG. 1 and FIG. 3, a plurality of radiating fins 24 is fixed onto the back surface 20*a* of the vertical plate 20 so that the radiating fins 24 is arranged on the back surface 20*a* of the vertical plate 20 at a predetermined interval. Each of the radiating fins 24 is placed at a right angle to the bottom wall 1*a* of the housing case 1. The structure of the radiating fins 24 generates and promotes a convection of warmed air in the light chamber 6. That is, each of the radiating fins 24 has a plate shape and is vertically fixed onto the back surface 20*a* of the vertical plate 20. As shown in FIG. 1, a plurality of the radiating fins 24 is extended from the back surface 20*a* of the vertical plate 20 toward the rear side of the housing case 1. The radiating fins 24 are arranged on the back surface 20*a* of the vertical plate 20 at a predetermined interval to each other. The surfaces of the radiating fins 24 are placed in the light chamber 6 in parallel to the direction from the bottom wall 1*a* and the ceiling wall 1*c* of the housing case 1. This structure of the group of the radiating fins 24 makes a circulation and convection of the flow of warmed air in the light chamber 6. That is, the flow of warmed air which rises from the bottom wall 1*a* side to the ceiling wall 1*c* side through the gap between the radiating fins 24 in the light chamber 6. The convection of the flow of warmed air is made along the radiating fins 24, the ceiling wall 1*c* of the housing case 1, the inner surface side of the lens cover 4, the bottom wall 1*a* side of the housing case 1 and the radiating fins 24 side. The structure of the radiating fins 24 according to the first embodiment makes a circulation flow of air in the light chamber 6 with high efficiency. That is, the structure of the radiating fins 24 promotes the convection of the flow of air in the light chamber 6.

A description will now be given of the detailed structure of each of the radiating fins 24 in the headlamp assembly according to the first embodiment.

Each of the radiating fins 24 has the same length which is equal to the vertical plate 20 in the vertical direction in the light chamber 6.

A predetermined gap is formed between the rear side of the radiating fins 24 and the rear wall 1*b* of the housing case 1. In addition, it is formed so that a predetermined gap is formed between the upper side of each of the radiating fins 24 and the ceiling wall 1*c* of the housing case 1 in order to flow the warmed air through the gap.

In particular, a slit 26 is formed in each of the radiating fins 24. The slit 26 is a groove and composed of a vertical slit part 26*a* and an inclined slit part 26*b*. As shown in FIG. 1, the vertical slit part 26*a* is vertically extended from the bottom side of the radiating fin 24. The inclined slit part 26*b* is extended from the top of the vertical slit part 26*a* toward the inclined upper side in the radiating fin 24.

The slit 26 is formed in each of the radiating fins 24 so that the top of the inclined slit part 26*b* is approximately equal to or lower than the bottom side of the horizontal plate 18 when the vertical plate 20 and the radiating fins 24 are assembled together. The top of the inclined slit part 26*b* is extended to an approximate intermediate point of the wide of the radiating fin 24 in the horizontal direction of the light chamber 6.

Figure 4:
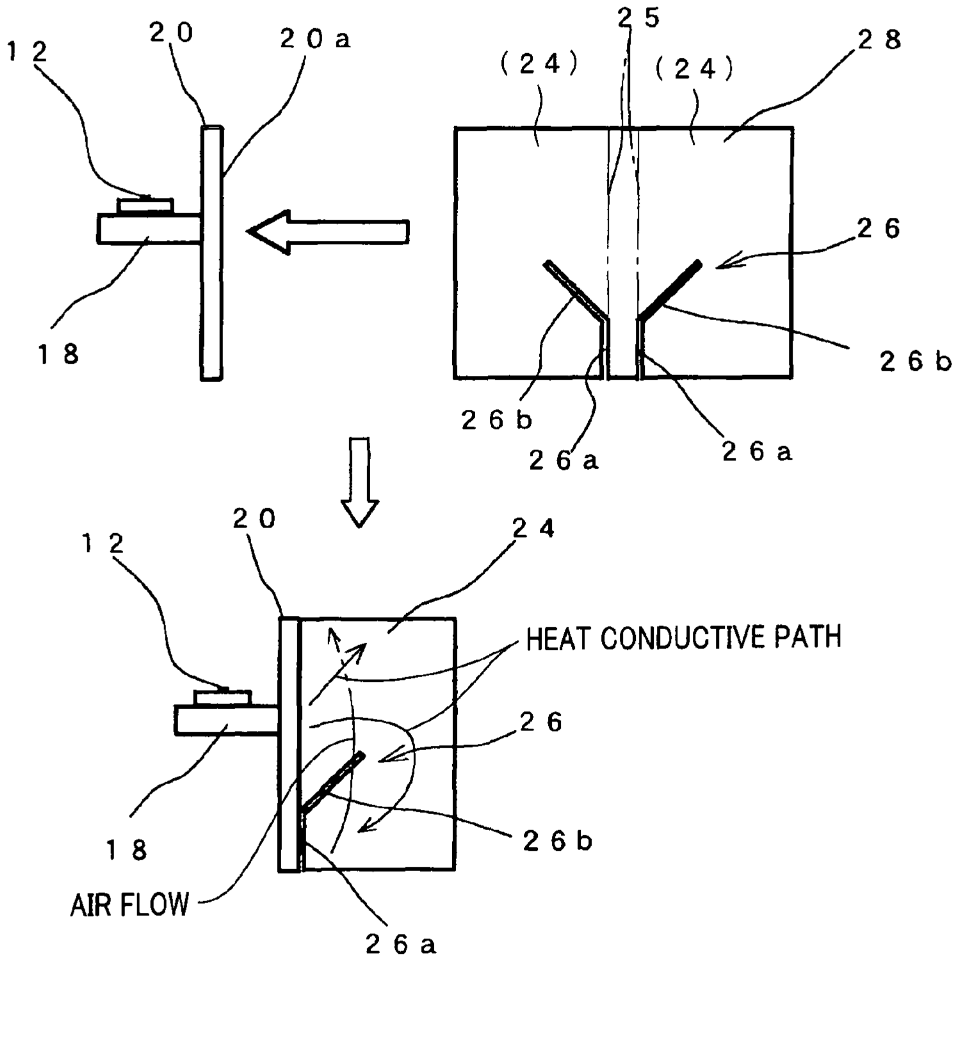
FIG. 4 is a schematic view showing the radiating fins in a radiating member of the headlamp assembly according to the first embodiment of the present invention.

FIG. 4 is a schematic view showing the radiating fin with the slit 26 in the headlamp assembly according to the first embodiment of the present invention. FIG. 4 also shows the process of producing the radiating fin 24 with the slit 26.

For example, the radiating fin 24 is made of high conductive material such as an aluminum thin plate. In the structure of the headlamp assembly according to the first embodiment, as shown in FIG. 4, two slits 26 are formed at a predetermined gap in a central area of a thin plate 28 of a rectangle shape. The predetermined gap is equal to the interval of the adjacent radiating fins 24 in the radiating member. That is, the two slits 26 are formed in bilateral symmetry on the thin plate 28.

The thin plate 28 is bent 90 degrees along the dash-dotted lines 25 while keeping the predetermined gap. This bending step makes the two radiating fins 24. A plurality of the pairs of the two radiating fins 24 is arranged and fixed to the back surface 20*a* of the vertical plate 20 by brazing, for example. As described above, it is possible to easily produce the radiating fins 24 with the slits 26 by a press.

Figure 5A:
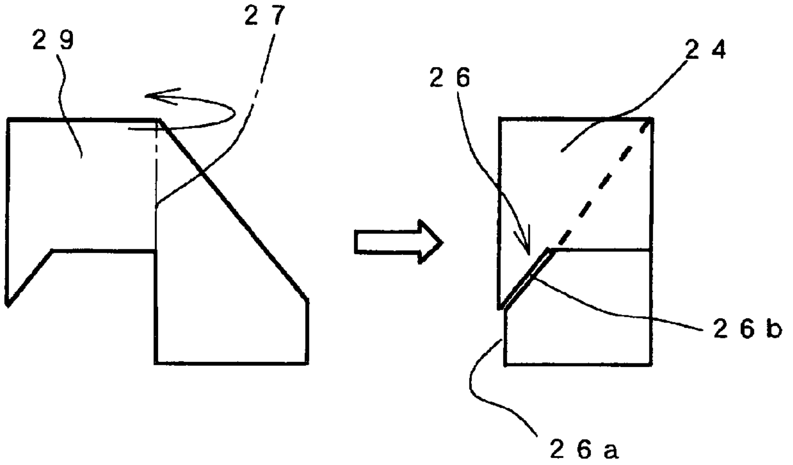
FIG. 5A and FIG. 5B are schematic views showing the radiating fins of another shape in the radiating member of the headlamp assembly according to the first embodiment of the present invention.
Figure 5B:
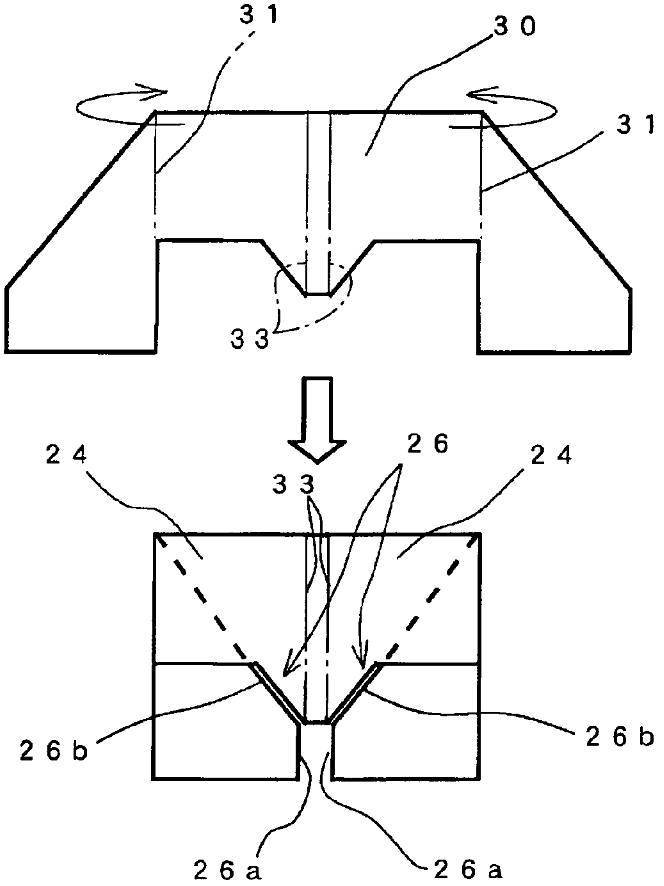

FIG. 5A and FIG. 5B are schematic views showing the radiating fins 24 of another shape according to the first embodiment of the present invention.

As shown in FIG. 5A, a corner part of an aluminum thin plate 29 is cut so that the cut corner part has a triangle shape. A corresponding corner part is cut so that the vertical slit part 26*a* and the inclined slit part 26*b* are formed in the aluminum thin plate 29 when the aluminum thin plate 29 is bent 180 degrees dash-dotted lines 27 after the cut process. A plurality of the radiating fins with the slit 26 composed of the vertical slit part 26*a* and the inclined slit part 26*b* are fixed with a predetermined interval to the back surface 20*a* of the vertical plate 20.

A plurality of the pairs of the radiating fins 24 is arranged and fixed to the back surface 20*a* of the vertical plate 20 by brazing, for example. As described above, it is possible to easily produce the radiating fins 24 with the slits 26 by a press.

An aluminum thin plate 30 is cut with the shape shown in FIG. 5B, in which two radiating fins are formed in bilateral symmetry along central two dash-dotted lines 33. After completion of the cutting step, the right part and the left part of the aluminum thin plate 30 is bent 180 degrees along the two dash-dotted lines 31, and is then bent 90 degrees along the central two dash-dotted lines 33. This makes it possible to form the two radiating fins 24, and each has the slit 26 composed of the vertical slit part 26*a* and the inclined slit part 26*b*.

Similar to the case shown in FIG. 5A previously described a plurality of the pairs of the two radiating fins 24, obtained by the above process, is arranged with a predetermined interval and fixed to the back surface 20*a* of the vertical plate 20 by brazing. As described above, it is possible to easily produce the radiating fins 24 with the slits 26 by brazing, etc.

By the way, the slit 26 in the radiating fin 24 has a linear shape. However, it is possible for the slit 26 to have a curved shape.

Figure 6:
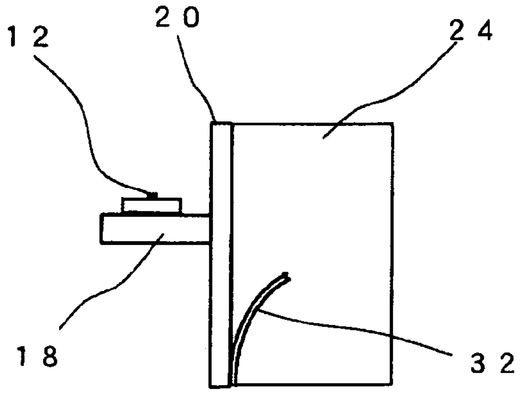
FIG. 6 is a schematic view showing another shape of the radiating fins in the radiating member of the headlamp assembly according to the first embodiment of the present invention.

FIG. 6 is a schematic view showing another shape of the slit 26 formed in each of the radiating fins 24 in the headlamp assembly according to the first embodiment of the present invention.

As shown in FIG. 6, the slit 32 formed in each of the radiating fins 24 has a curved shape from the bottom part to the upper part.

On the other hand, as shown in FIG. 1, leading wires 34 are connected to the light source 12 and extended to the outside of the housing case 1 through the rear wall 1*b* of the housing case 1. The leading wires 34 are electrically connected to a drive circuit 38 through a connector 36. The drive circuit 38 is a known device for controlling an electric power supply to the light source 12.

Next, a description will now be given of the actions and effects of the headlamp assembly according to the first embodiment of the present invention.

When the motor vehicle starts to drive and the light source is then turned on, the light emitted from the light source 12 is reflected by the reflector 14.

The shade 10 cuts off a part of the light reflected by the reflector 14, and the projection lens 8 irradiates the remained part (or non-cut off part) of the light toward the forward direction.

The heat energy generated by the light source 12 is conducted to the vertical plate 20 through the horizontal plate 18, and finally conducted to the radiating fins 24 through the vertical plate 20. The heat radiation from the radiating fins 24 warms the ambient air around the radiating fins 24, the air is expanded, and an air density is thereby decreased.

The expanded warmed air rises between the adjacent radiating fins 24 toward the ceiling wall 1*c* of the housing case 1. The air between the adjacent radiating fins 24 is continuously warmed and rises.

As shown by the arrow in FIG. 1, the rising air flows in the convection to the front lens cover 4 along the ceiling wall 1*c* of the housing case 1. The heat exchange is executed between the warmed air and the outside ambient air of the headlamp assembly through the rear wall 1*b*, the ceiling wall 1*c*, the side wall (omitted from drawings) and the lens cover 4. The heat exchange cools the circulated warmed air in the light chamber 6.

Further, the air then falls along the lens cover 4, and then flows from the bottom side of the lens cover 4 along the bottom wall 1*a* of the housing case 1, and then passes through the gap between the bottom surface of the shade 10 and the bottom wall 1*a* of the housing case 1. During the above air circulation flow, the heat exchange is executed between the bottom wall 1*a* of the housing case 1 and the outside ambient air of the headlamp assembly.

The circulation air rises through the gap between the adjacent radiating fins 24 and the heat energy from the radiating fins 24 continuously warm the circulation air. The warmed circulation air then rises again toward the ceiling wall 1*c* of the housing case 1.

The warmed air passed through the adjacent radiating fins 24 reaches the ceiling wall 1*c* of the housing case 1 and flows along the inner side of the lens cover 4. The cooled air after the heat exchange flows along the bottom wall 1*a* of the housing case 1, and is then supplied to the gap between the adjacent radiating fins 24. Thus, the air circulation, namely, the convection is generated in the housing case 1.

In particular, because the outside air directly blows the outside surface of the lens cover 4 when the motor vehicle is running, the heat exchange between the warmed air in the inside of the housing case 1 and the outside ambient air, the circulation path of convention of the inside air is made at the inside of the lens cover 4, the heat exchange is promoted and the warmed air is thereby cooled.

As shown in FIG. 4, the heat energy generated in the light source 12 is conducted to the vertical plate 20 through the horizontal plate 18, and then conducted from the vertical plate 20 to the radiating fins 24.

When the heat energy generated in the light source 12 is conducted from the vertical plate 20 to the radiating fins 24, the presence of the slit 26 prevents the heat energy supplied through the vertical plate 20 from being directly conducted to the bottom part of each of the radiating fins 24. In other words, the heat conduction in the radiating fin 24 occurs around the slit 26. That is, the heat conduction is temporarily shifted toward the upper side of the radiating fin 24, and shifted toward the bottom side of the radiating fin 24, as designated by the arrows shown in FIG. 4, around the slit 26 composed of the vertical slit part 26*a* and the inclined slit part 26*b*.

As indicated by the thin arrow straight line shown in FIG. 4, a part of the heat energy is conducted toward the upper part of the radiating fin 24, and a part of the remained heat energy is conducted around the slit 26 toward the bottom part of the radiating fin 24.

When the air rises through the gap between the adjacent radiating fins 24 toward the ceiling wall 1*c* of the housing case 1, the air is warmed by the heat energy radiated through the radiating fins 24. At this time, because the heat conduction is curved around the slit 26 composed of the vertical slit part 26*a* and the inclined slit part 26*b* in the radiating fins 24, the radiating fin 24 has a long heat conduction path.

During the heat conduction through the long conduction path formed in the radiating fin 24, the heat energy is radiated from the surface of the radiating fin 24. As a result, the total quantity of heat energy which reaches the bottom part of the radiating fin 24 is smaller than the total quantity of heat energy which reaches the upper part of the radiating fin 24 because the heat energy must be conducted to the bottom part through the long heat conduction path by the presence of the slit 26. As a result, the temperature of the upper part becomes higher than that of the bottom part of the radiating fin 24. That is, the temperature difference occurs between the upper part and the bottom part of the radiating fin 24.

The bottom part of the radiating fin 24 has a low temperature rising rate. The warmed air which is warmed by the heat energy radiated from the bottom part of the radiating fin 24 rises toward the upper direction. At the upper part of the radiating fin 24, the warmed air rising from the bottom part and the air warmed by the heat energy through the upper part of the radiating fin 24 are combined. Because there is a large temperature difference between the warmed air rising from the bottom part and the warmed air in the upper part of the radiating fin 24, the warmed air rising from the bottom part is further warmed by the heat energy of the warmed air and the heat energy radiated from the upper part of the radiating fin 24. This further decreases the air density.

Having the slit 26 in each of the radiating fins 24 generates a temperature difference, as previously described, between the bottom part and the upper part of the radiating fin 24, the air density around the upper part of the radiating fin 24 is further decreased. This increases the flowing speed of warmed air between the adjacent radiating fins 24 in the light chamber 6.

Figure 16:
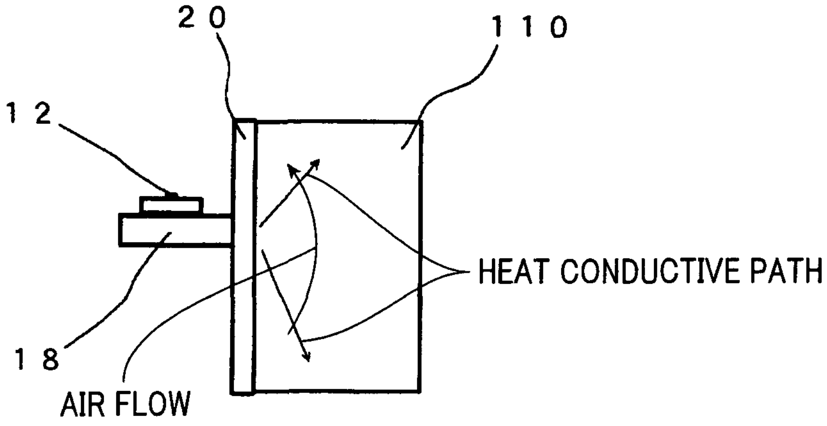
FIG. 16 is an explanatory view showing the radiation of heat energy from a radiation member having a conventional shape used in a conventional headlamp assembly.

FIG. 16 is an explanatory view showing the radiation of heat energy from a radiation member comprised of radiating fins 110 having a conventional shape used in a conventional headlamp assembly.

For example, as shown in FIG. 16, heat conduction occurs from the vertical plate 20 fixed to the horizontal plate 18 to the radiating fin 110 without any slit part. Accordingly, the heat energy is uniformly conducted in the entire of the radiating fin 110. In other words, any temperature difference occurs in the conventional radiating fin 110, and uniform heat energy is conducted in the entire area of the conventional radiating fin 110.

Accordingly, when air rises from the bottom part to the upper part of the radiating fin 110 through the gap between the adjacent radiating fins 110, the air is firstly warmed by the heat energy radiated from the bottom part. The warmed air is further warmed by the heat energy radiated in the gap between the adjacent radiating fins 110 because the entire of the radiating fin 110 has a uniform temperature distribution. In other words, there is a small difference between the air around the bottom part and the warmed air around the upper part of the conventional radiating fin 110. This small temperature difference causes a small temperature rise of the air, and a small decreasing rate of the air density, and a small flowing speed of the air.

On the other hand, in the structure of the headlamp assembly according to the first embodiment of the present invention, the slit 26 is formed in each of the radiating fins 24. Making the slit 26 composed of the vertical slit part **26*a* and the inclined slit part 26*b* in each of the radiating fins 24 makes it possible to generate the temperature difference between the upper part and the bottom part of each of the radiating fins 24. The temperature difference in the upper part and bottom part of the radiating fin 24 increases the flow speed of air which passes through in the gap between the adjacent radiating fins 24. This makes it possible to increase the radiating capability of the radiating fins 24 because the quantity of the flow of air which passes through the gap between the adjacent radiating fins 24 is increased by the increase of the flow speed of air. This makes it possible to further suppress the temperature of air in the light chamber 6 from increasing. It is thereby possible to suppress the temperature of the light source 12 and radiating fins 24** from increasing. As a result, it is possible for the headlamp assembly according to the first embodiment to increase the radiating capability without increasing the size and power consumption of the headlamp assembly.

Generating the convection of air along the ceiling wall **1*c* of the housing case 1, the inner surface of the lens cover 4 and the bottom wall 1*a* of the housing case 1 can promote the capability of cooling the circulated flow of air in the light chamber 6. When the vehicle drives on a road in cold weather, snow and ice are often attached on the front lens cover 4 of the headlamp assembly. Because the inside air in the light chamber 6, namely, the air in the space formed by the front lens cover 4 and the housing case 1 is warmed by the heat energy generated by the light source 12, the snow and ice attached on the outside surface of the head cover 4 are heated and then melted by the convection of the flow of air in the light chamber 6**. This maintains the radiation of the light from the headlamp assembly toward the front of the running vehicle.

Second Embodiment

Next, a description will be given of the headlamp assembly according to the second embodiment of the present invention with reference to FIG. 7 to FIG. 10. The same components of the headlamp assemblies according to the first and second embodiments shown in FIG. 1 to FIG. 10 will be referred with the same reference numbers and the explanation of them is omitted for brevity.

Figure 7:
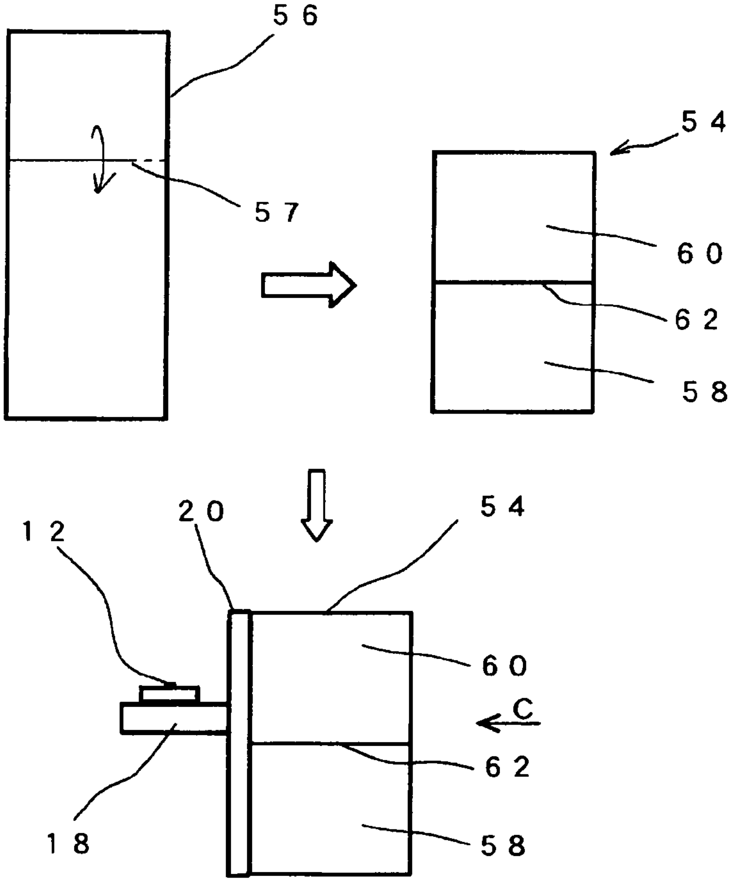
FIG. 7 is a schematic view showing the radiating fins in the radiating member of the headlamp assembly according to a second embodiment of the present invention.

FIG. 7 is a schematic view showing radiating fins 54 in the radiating member in the headlamp assembly according to the second embodiment of the present invention. As shown in FIG. 7, the radiating fin 54 does not have any slit. The radiating fin 54 is made by the following steps.

An upper one-third part of an aluminum thin plate 56 is bent 180 degrees along the dash-dotted line 57. The upper one-third part and the remained part of the aluminum thin plate 56 are overlapped together. This makes a difference in level (or a different level) designated by the straight line 62 shown in FIG. 7 on the surface of the radiating fin 54.

The above steps make the radiating fin 54 having the two part, namely, the bottom part 58 and the upper part 60. The bottom part 58 has a first thickness. The upper part 60 has a second thickness which is twice of the first thickness because the upper part is made by bending the upper one-third part of the aluminum thin plate 56. In other words, the upper part 60 has a large heat capacity rather than that of the bottom part 58 of the radiating fin 54.

Figure 8:
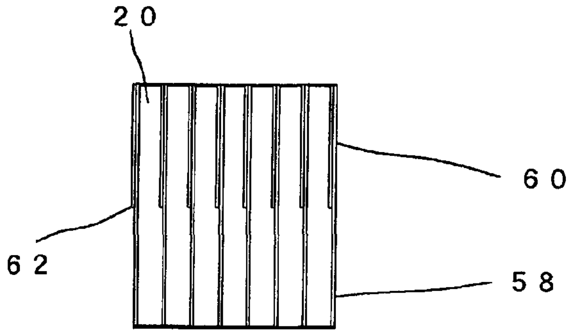
FIG. 8 is a view showing a cross section of the headlamp assembly when observed from the rear side designated by the arrow C shown in FIG. 7.

FIG. 8 is a view showing a cross section of the headlamp assembly according to the second embodiment when observed from the rear side designated by the arrow C shown in FIG. 7.

As shown in FIG. 7 and FIG. 8, a plurality of the radiating fins 54 is fixed onto the vertical plate 20 at a predetermined interval by brazing, etc. Each of the radiating fins 54 has the difference in level (or the different level) designated by the straight line 62. The difference 62 in level is formed at a central part of the radiating fin 54, namely, makes the boundary between the upper part 60 and the bottom part 58 in the radiating fin 54.

When the radiating fins 54 having the above structure are used in the headlamp assembly, the flow of air between the adjacent radiating fins 54 is firstly warmed by the heat energy radiating from the bottom part 58. The warmed air rises between the adjacent radiating fins 54 to the upper part 60 thereof. The warmed air is further warmed by the heat energy radiating from the upper part 60 of the radiating fin 54, and rises to the ceiling wall **1*c* of the housing case 1**.

Because the heat capacity of the bottom part 58 is lower than that of the upper part 60 in each of the radiating fins 54, less heat energy is conducted to the bottom part 58 and more heat energy is conducted to the upper part 60. Accordingly, because the heat energy supplied to the ambient air from the bottom part 58 is lower than that from the upper part 60 of the radiating fin 54, the temperature of the ambient air around the bottom part 58 is lower than that of the ambient air around the upper part 60. This makes a temperature difference between the bottom part 58 and the upper part 60 in the radiating fin 54.

The temperature rising speed of air which is warmed by the heat energy radiated from the bottom part 58 is smaller than that of air which is warmed by the heat energy radiated from the upper part 60. When the air, which is rising from the bottom part 58, is warmed by the heat energy radiated from the upper part 60 of the radiating fin 54, a large temperature difference is generated between the rising air and the upper part 60 of the radiating fin 54. This large temperature difference makes the rising air further warmed. As a result, the temperature of the rising air is further increased, and an air density of the rising air is more decreased.

Because the thickness of the upper part 60 is larger than that of the bottom part 58 of the radiating fin 54, a temperature difference is generated between the upper part 60 and the bottom part 58 in the radiating fin 54. This more decreases the air density at the upper part 60 rather than at the bottom part 58, and increases the flow speed of air which rises through the gap between the adjacent radiating fins 54.

Similar to the structure of the headlamp assembly according to the first embodiment previously described the surfaces of the radiating fins 54 are placed in the light chamber 6 in parallel to the direction from the bottom wall 1*a* and the ceiling wall 1*c* of the housing case 1. This structure of the group of the radiating fins 54 makes a circulation and convection of the flow of warmed air in the light chamber 6. That is, the flow of warmed air which rises from the bottom wall 1*a* side to the ceiling wall 1*c* side through the gap between the radiating fins 54 in the light chamber 6. The convection of the flow of warmed air is made along the radiating fins 54, the ceiling wall 1*c* of the housing case 1, the inner surface side of the lens cover 4, the bottom wall 1*a* side of the housing case 1 and the radiating fins 54 side. The structure of the radiating fins 54 according to the second embodiment makes a circulation flow of air in the light chamber 6 with high efficiency. That is, the structure of the radiating fins 54 promotes the convection of the flow of air in the light chamber 6.

Similar to the effects of the headlamp assembly according to the first embodiment previously described, a greater quantity of air passes through the gap between the adjacent radiating fins 54, and the radiating capability of the radiating fins 54 is thereby increased. This can suppress the temperature of air flowing in the light chamber 6 from increasing. It is thereby possible to suppress the temperature of the light source 12 and the radiating member 16 composed of the radiating fins 54.

As a result, it is possible for the headlamp assembly according to the second embodiment to increase the radiating capability without increasing the size and power consumption of the headlamp assembly.

Further, because the gap which is formed between the adjacent radiating fins 54 is wide at the bottom part 58 and is narrow at the upper part 60 of the radiating fin 54, the width of the flow path of air in the gap formed between the adjacent radiating fins 54 becomes narrow. The chimney effect is generated in the gap formed between the adjacent radiating fins 54, and this increases the flowing speed of air, and thereby increases the radiating capability of the radiating fins 54.

Still further, because the difference in level (or the different level) designated by the straight line 62 shown in FIG. 7 is formed in the radiating fin 54, and the difference in level is placed between the adjacent radiating fins 54 when the radiating fins 54 are fixed to the vertical plate 20, the air which rises through the gap between the adjacent radiating fins 54 is collided with the difference in level, and the difference in level (designated by the straight line 62) generates turbulence in the flow of the rising air. The rising air is thereby mixed.

The surface of the radiating fin 54 has the highest temperature, and the temperature of the air around the radiating fins 54 is gradually decreased by the heat conductance from the radiating fins 54 to the air in the space around the radiating fins 54 in the light chamber 6. This generates temperature boundaries in the space around the radiating fins 54.

Generation of the turbulence in the flow of the rising air breaks the temperature boundaries. This makes it possible to contact the rising air of a low temperature with the surfaces of the radiating fins 54. Because the temperature difference between them is large, the radiating capability of the radiating fins 54 thereby increases, and heat energy is conducted from the radiating fins 54 to the air with high efficiency.

Figure 9:
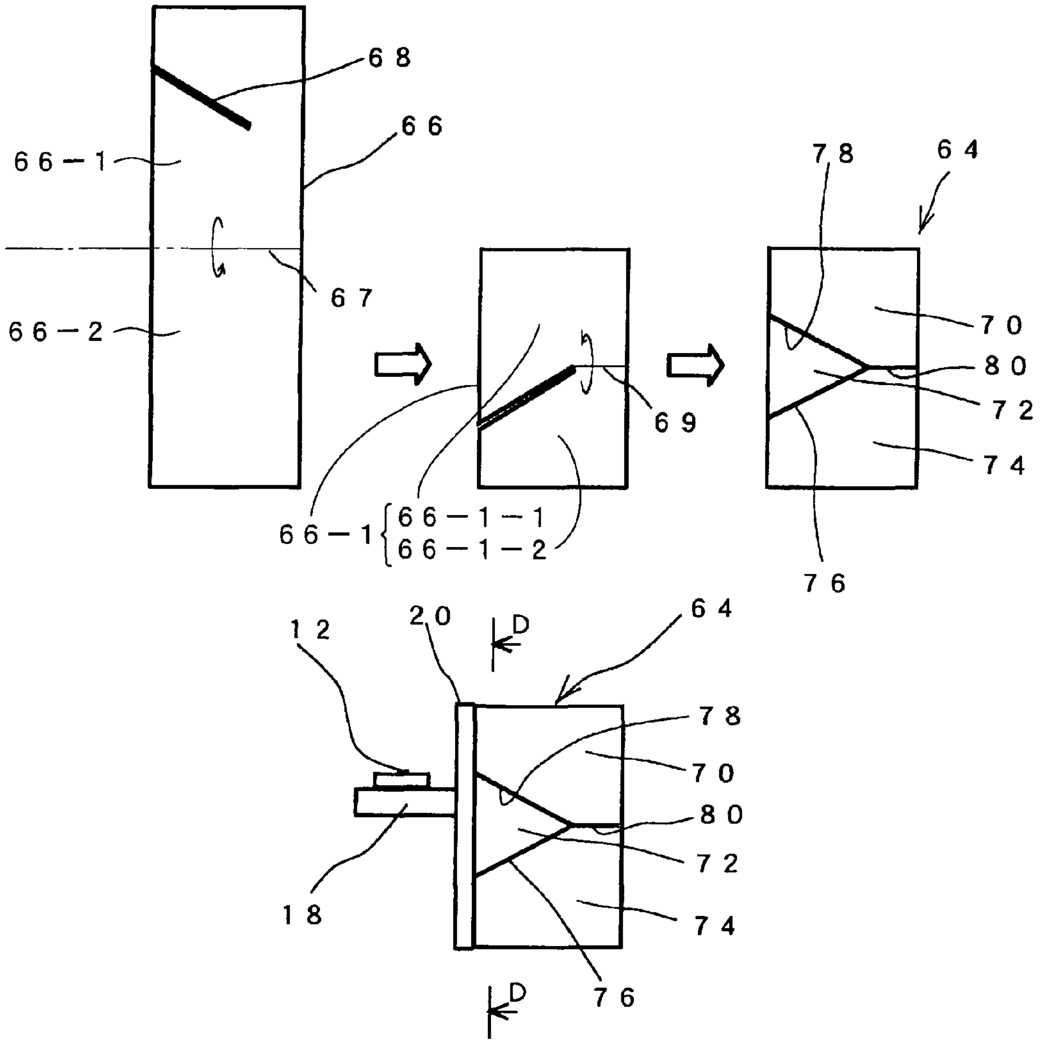
FIG. 9 is a schematic view showing another shape of the radiating fins in the radiating member of the headlamp assembly according to the second embodiment of the present invention.

FIG. 9 is a schematic view showing another shape of the radiating fins in the radiating member of the headlamp assembly according to the second embodiment of the present invention.

It is possible for each of the radiating fins 54 to have a different shape shown in FIG. 9.

The radiating fin 64 shown in FIG. 9 is produced by the following steps:

(a) As shown at the left side in FIG. 9A, an inclined slit part 68 is formed at the intermediate area in the upper one-half part 66-1 of an aluminum thin plate 66. The upper one-half part 66-1 and the bottom one-half part 66-2 are obtained by dividing the aluminum thin plate 66 along the intermediate dash-dotted line 67;

(b) As shown at the left side in FIG. 9, the upper one-half part 66-1 is bent 180 degrees along the intermediate dash-dotted line 67. The upper one-half part 66-1 and the bottom one-half part 66-2 of the aluminum thin plate 66 are thereby overlapped or stacked together, as shown at the central side in FIG. 9; and (c) As shown at the central side in FIG. 9, only the upper one-half part 66-1, which has already been overlapped with the bottom one-half part 66-2, is further bent 180 degrees along the straight line 69 in order to make an upper one-half part 66-1-1 and a bottom one-half part 66-1-2. At this time, the radiating fin 64 has the two differences in level (or the different levels). The boundaries of the two differences in level are designated by the inclined straight lines 76 and 78 at the right side in FIG. 9.

As clearly shown at the right side in FIG. 9, the above production steps make the upper part 70, the central part 72 and the bottom part 74 in the radiating fin 64. In the radiating fin 64, the upper part 70 has a triple layer structure, the central part 72 has a double layer structure and the bottom part 74 has a single layer structure.

The upper part 70, the central part 72 and the bottom part 74 have a different heat capacity, respectively, because of having a different thickness.

Figure 10:
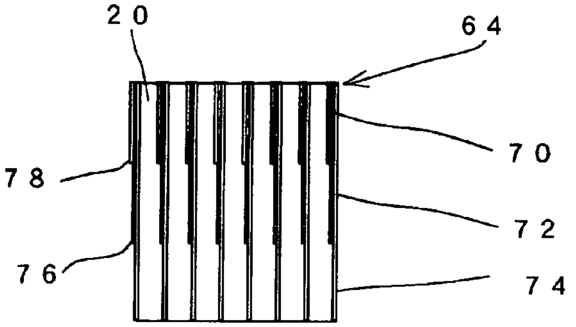
FIG. 10 is a view showing a cross section of the radiating fins in the headlamp assembly along the D-D line shown in FIG. 9.

FIG. 10 is a view showing a cross section of the radiating fins 64 in the headlamp assembly along the D-D line shown in FIG. 9.

As shown in FIG. 10, a plurality of the radiating fins 64 is produced. The radiating fins 64 are arranged at a predetermined interval and fixed onto the vertical plate 20 along the horizontal direction by brazing, etc. The difference in level (designated by the inclined straight line 76) is formed at the boundary between the bottom part 74 and the central part 72. Further, the difference in level (designated by the inclined straight line 78) is formed at the boundary between the upper part 70 and the central part 72.

When the radiating fins 64 having the above structure are assembled to the vertical plate 10 in the headlamp assembly according to the second embodiment, the flow of air between the adjacent radiating fins 64 is firstly warmed by the heat energy radiated from the bottom part 74 of the radiating fin 64. The warmed air rises upward to the central part 74 between the adjacent radiating fins 64. The rising warmed air is further warmed by the heat energy radiated from the central part 72 of the radiating fin 64. The warmed air further rises upward to the upper part 70 between the adjacent radiating fins 64. The rising warmed air is further warmed by the heat energy radiated from the upper part 70 of the radiating fin 64. Then, the rising warmed air further rises to the ceiling wall 1*c* of the housing case 1.

In the radiating fin 64 having the above structure, because the heat capacity of the bottom part 74 is lower than the heat capacity of each of the central part 72 and the upper part 60, less heat energy is conducted to the bottom part 74, and more heat energy is conducted to the central part 72 and the upper part 70 rather than the bottom part 74. Accordingly, because the heat energy radiated from the bottom part 74 is lower than the heat energy radiated from each of the central part 72 and the upper part 70 in the radiating fin 64, the temperature of air around the bottom part 74 is lower than the temperature of air around the central part 72, and lower than the temperature of air around the upper part 70. This makes a temperature difference between the bottom part 74, the central part 72 and the upper part 70 in the radiating fin 64.

As described above, because a large temperature difference is generated between the bottom part 74, the central part 72 and the upper part 70, this further decreases the density of air around the upper part 70 in the radiating fin 64.

Because the upper part 70, the central part 72 and the bottom part 74 have a different thickness in the radiating fin 64 shown in FIG. 10, the temperature difference occurs around them. As a result, the density of air around the upper part 70 of the radiating fin 64 is more decreased, namely, becomes low. This increases the flow speed of the rising warmed air between the adjacent radiating fins 64. In addition, the chimney structure of the adjacent radiating fins 64 shown in FIG. 10 further increases the flow speed of the rising warmed air between the adjacent radiating fins 64.

Accordingly, similar to the effects of the headlamp assembly according to the first embodiment, a more quantity of air flows and rises between the adjacent radiating fins 64 in the light chamber 6 in the headlamp assembly. The structure of the radiating fins 64 increases the radiating capability, and suppresses the temperature of air in the light chamber 6 from increasing, and thereby suppresses the temperature of the light source 12 and the radiating member 16 composed of the radiating fins 64 from increasing. As a result, it is possible for the headlamp assembly to have an improved radiating capability without increasing the total size and electric power consumption thereof.

Still further, because the upper part 70, the central part 72 and the bottom part 74 have a different thickness, in other words, the gap at the upper part 70 between the adjacent radiating fins 64 is narrower than the gap at the central part 72 between them, and the gap at the central part 72 between them is narrower than the gap at the bottom part 74 between them, the flow speed of the rising air between the adjacent radiating fins 64 is increased, and this increases the radiating capability of the radiating fins 64.

Still further, as shown in FIG. 10, the two differences in level designated by the reference numbers 76 and 78 are formed on each of the radiating fins 64, the air which rises between the adjacent radiating fins 64 strikes the differences in level designated by the reference numbers 76 and 78. This causes turbulence in the flow of rising air, and the turbulence stirs the rising air.

Generating the turbulence in the flow of rising air breaks the temperature boundary layers around the radiating fins 64, and as a result, the rising air of a low temperature is contacted with the surface of the radiating fins 64. A large temperature difference between the rising air and the surface of the radiating fin 64 promotes the heat conductance between them. This increases the radiating capability of the radiating fins 64.

Third Embodiment

Figure 11:
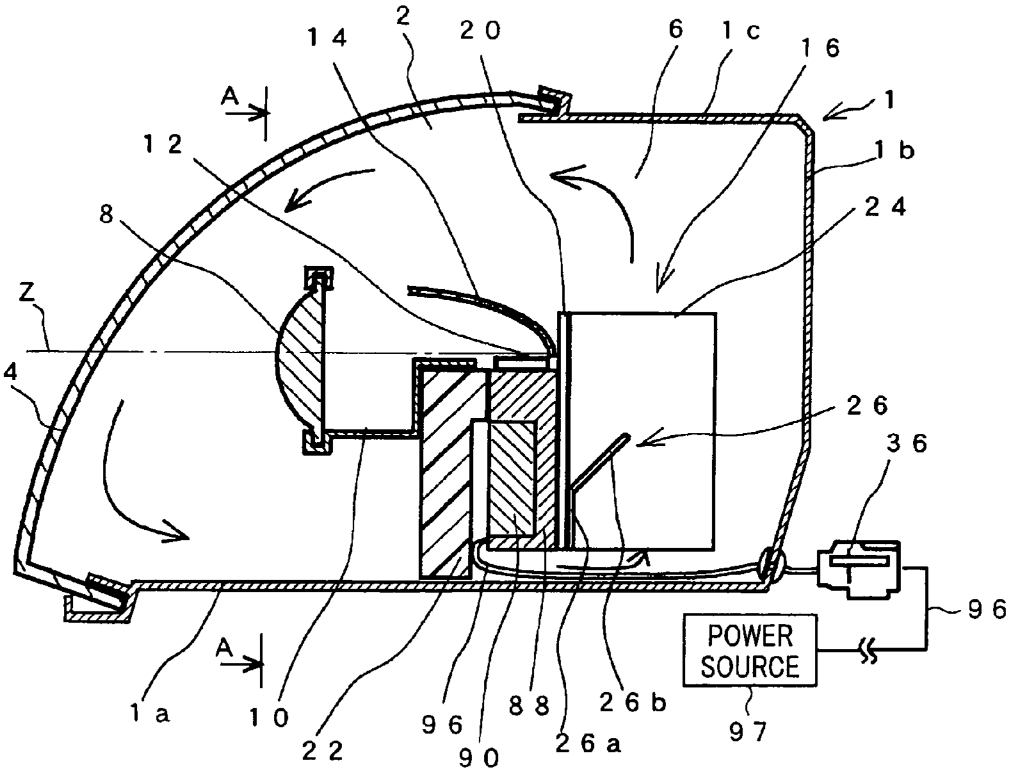
FIG. 11 is a schematic view showing a vertical cross section of a headlamp assembly mounted to a vehicle according to a third embodiment of the present invention.

A description will be given of the headlamp assembly according to the third embodiment of the present invention with reference to FIG. 11 to FIG. 15. FIG. 11 is a schematic view showing a vertical cross section of the headlamp assembly mounted to a vehicle according to the third embodiment of the present invention.

In the structure of the headlamp assemblies according to the first and second embodiments previously described, the light source 12 is fixed to the horizontal plate 18, and the horizontal plate 18 is fixed to the vertical plate 20.

On the other hand, as shown in FIG. 11, the headlamp assemblies according to the third embodiment has a mount member 88 of a square pillar shape. The light source 12 is fixed to the mount member 88. The mount member 88 is fixed to the vertical plate 20 in the radiating member 16. The drive circuit 90 is placed in the mount member 88. The drive circuit 90 supplies electric power to the light source 12.

Figure 12:
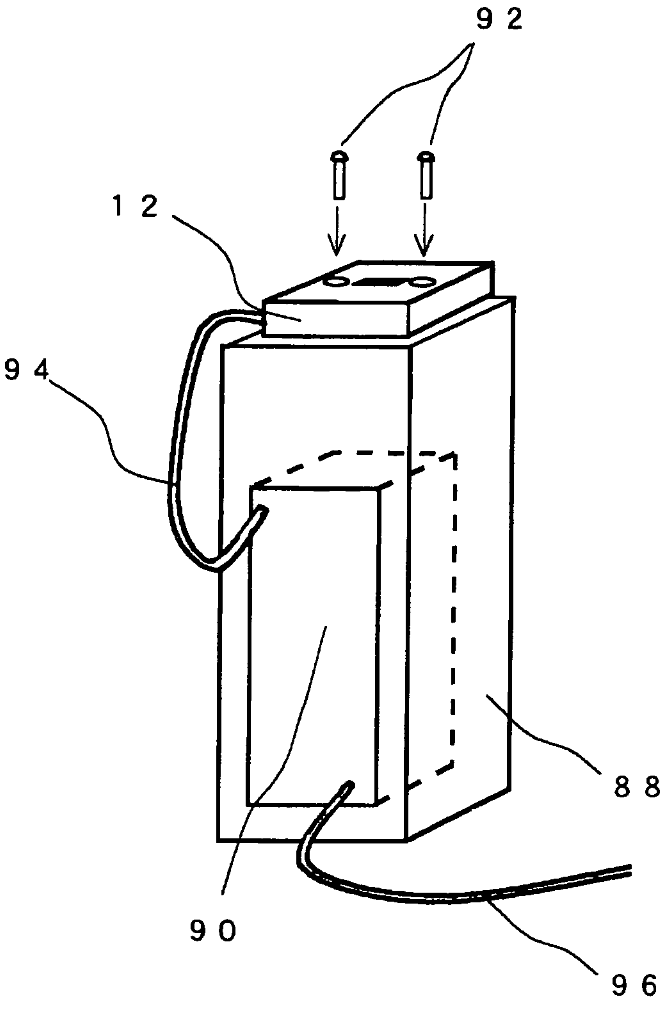
FIG. 12 is an enlarged perspective view showing a mount member in the headlamp assembly according to the third embodiment shown in FIG. 11.

FIG. 12 is an enlarged perspective view showing the mount member 88 in the headlamp assembly according to the third embodiment shown in FIG. 11.

As shown in FIG. 12, the mount member 88 has a square pillar shape, and a cross section of the mount member 88 is a square shape. The light source 12 is fixed onto the top surface of the mount member 88 by screws 92. The drive circuit 90 is placed in the inside of the mount member 88. The drive circuit 90 is electrically connected to the light source 12 through leading wires 94.

As shown in FIG. 11, the drive circuit 90 is also electrically connected to an electric power source 97 through leading wires 96 and a connector 36.

Figure 13A:
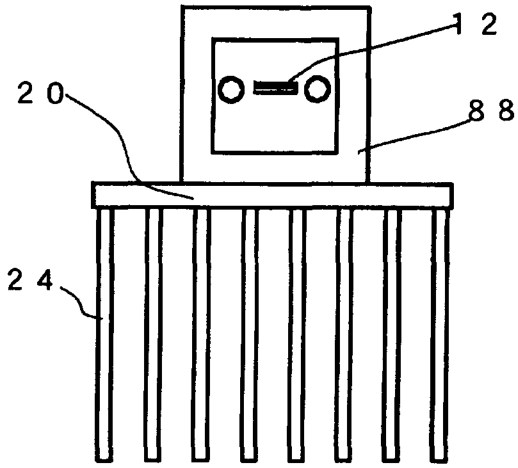
FIG. 13A and FIG. 13B are plan views, each showing the mounting member to which the radiating member is fixed in the headlamp assembly according to the third embodiment.
Figure 13B:
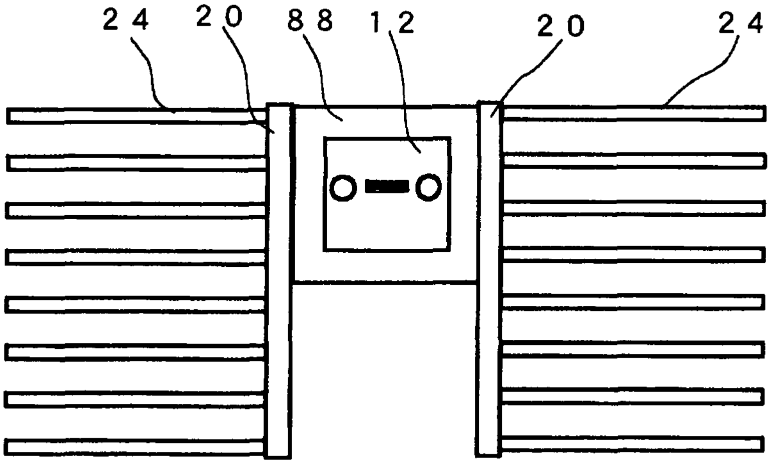

FIG. 13A and FIG. 13B are plan views, each showing the mounting member 88 to which the radiating member 16 composed of the vertical plate 20 and the radiating fins 24 is fixed in the headlamp assembly according to the third embodiment.

As shown in FIG. 13A, the vertical plate 20 is fixed onto the back surface of the mount member 88, and a plurality of the radiating fins 24 is fixed at a predetermined interval in the horizontal direction onto the surface of the vertical plate 20.

In the structure shown in FIG. 13A, the surfaces of each of the radiating fins 24 are placed in the light chamber 6 in parallel to the direction from the bottom wall 1*a* and the ceiling wall 1*c* of the housing case 1. This structure of the group of the radiating fins 24 makes a circulation and convection of the flow of warmed air in the light chamber 6.

As shown in FIG. 13B, two groups of the radiating fins 24 and the vertical plates 20 are prepared. One group is comprised of the vertical plate 20 and the radiating fins 24. It is possible form the above two groups to be fixed onto the two side surfaces of the mount member 88, respectively.

In the structure shown in FIG. 13B, the surfaces of each of the radiating fins 24 are placed in the light chamber 6 in parallel to the direction from the bottom wall 1*a* and the ceiling wall 1*c* of the housing case 1. This structure of the group of the radiating fins 24 makes a circulation and convection of the flow of warmed air in the light chamber 6.

Figure 14:
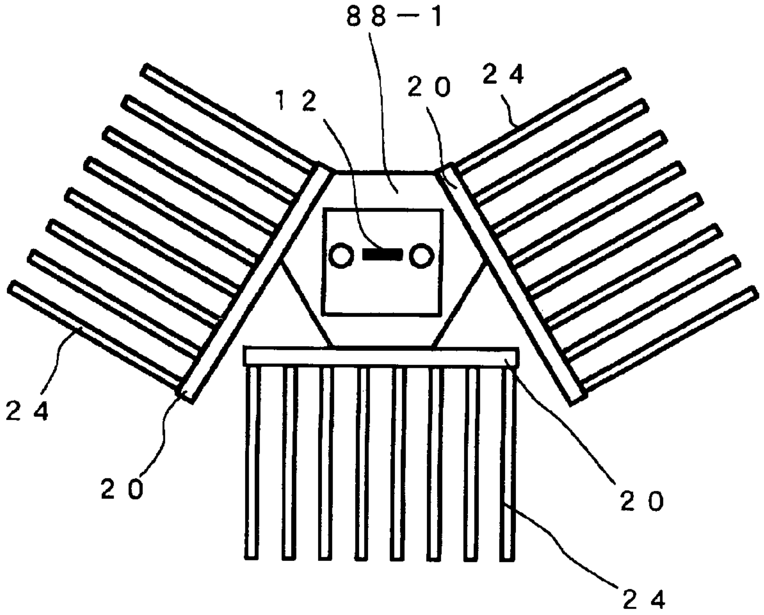
FIG. 14 is a plan view showing the mounting member of other shape to which the radiating member is fixed in the headlamp assembly according to the third embodiment.

FIG. 14 is a plan view showing the mounting member 88-1 of other shape to which the radiating member 16 comprised of the vertical plates 20 and the radiating fins 24 are fixed in the headlamp assembly according to the third embodiment.

As shown in FIG. 14, it is possible to use a mount member 88-1 of a hexagonal pillar shape in which the drive circuit 90 to be placed. Further three groups are prepared, each group is comprised of the vertical plate 20 and the radiating fins 24. The three groups are fixed onto the three side surfaces of the mount member 88-1, respectively.

In the structure shown in FIG. 14, the surfaces of each of the radiating fins 24 are placed in the light chamber 6 in parallel to the direction from the bottom wall 1*a* and the ceiling wall 1*c* of the housing case 1. This structure of the group of the radiating fins 24 makes, a circulation and convection of the flow of warmed air in the light chamber 6.

It is possible to use the vertical plate 20 and the radiating fin 24 as the radiating means capable of radiating the heat energy radiated from the drive circuit 90 when the drive circuit 90 is placed in the mount member 88 (or 88-1). When the light source 12 is placed apart from the drive circuit 90, it is possible to avoid the influence of heat energy supplied from the light source 12 to the drive circuit 90, and to conduct the heat energy from the light source 12 to the vertical plate 20 and the radiating fins 24 through the mount member 88. This makes it possible to radiate the heat energy from the drive circuit 90 and the light source 12 through the radiating fins 24.

Figure 15:
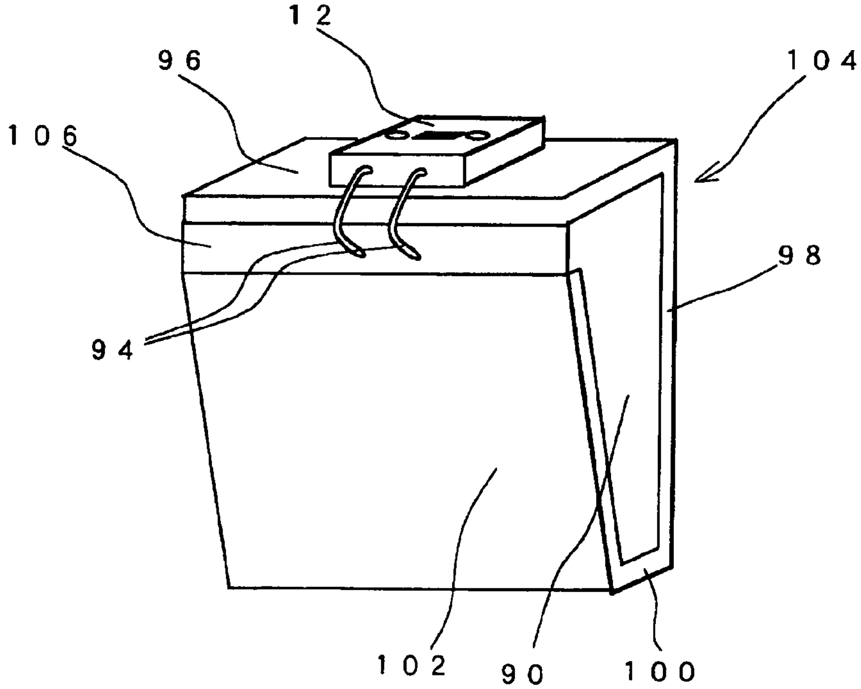
FIG. 15 is an enlarged perspective view showing the mounting member of other shape to which the radiating member is fixed in the headlamp assembly according to the third embodiment.

FIG. 15 is an enlarged perspective view showing the mounting member of other shape in the headlamp assembly according to the third embodiment shown in FIG. 11.

The concept of the present invention is not limited by the structure of the mount member 88 of a square pillar shape and the structure of the mount member 88-1 of a hexagonal pillar shape. For example, it is possible for the headlamp assembly to have a mount member 104 shown in FIG. 15. The structure of the mount member 105 is composed of an upper wall part 96, a back wall part 98, a bottom wall part 100 and a front wall part 102.

As shown in FIG. 15, the light source 12 is fixed onto the top surface of the upper wall part 96. The back wall part 98 is extended from the upper wall part 96 in a direction, which is at a right angle to the upper wall part 96, to the bottom wall part 100. The bottom wall part 100 is extended from the bottom side of the back wall part 98 to the front wall part 102. The front wall part 102 is extended from the bottom wall part 100 to the upper wall part 96. The vertical plate 20 and a plurality of the radiating fins 24 are fixed onto the surface of the back wall part 98.

The drive circuit 90 is placed in the space which is made by the upper wall part 96, the back wall part 98, the bottom wall part 100 and the front wall part 102. It is possible to form a gap between the upper wall part 96 and the front wall part 102, and to leak heat energy generated by the drive circuit 90.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

The invention claimed is:

1. A headlamp assembly for a motor vehicle comprising:

a housing case, and a front part of the housing case being open;

a lens cover fitted to the front part of the housing case, and the lens cover and the housing case forming a light chamber;

a light source for emitting light placed in the light chamber;

a reflector, placed in the light chamber, for reflecting the light emitted from the light source toward a front direction of the headlamp assembly, the reflector being placed at a rear position of the light source and partially surrounding the light source;

a shade, placed in the light chamber, for cutting off a part of the light reflected by the reflector;

a projection lens, placed in the light chamber, for projecting the light reflected by the reflector toward the front direction of the headlamp assembly through the lens cover;

a radiating member, comprised of a plurality of radiating fins placed in the light chamber at a right angle to a bottom wall side of the housing case, each of the radiating fins having a plate shape, an upper part and a bottom part of each of the radiating fins having a different heat capacity with which a different quantity of heat energy being conducted, and heat energy generated by the light source being radiated through the radiating fins; and the projection lens, the shade, and the light source being arranged in line from the front end of the headlamp assembly along an axial direction of the light source; wherein a slit is formed in the bottom part of each of the radiating fins in order for the upper part and the bottom part of each of the radiating fins to have a different heat conduction of heat energy.

2. The headlamp assembly according to claim 1, wherein each of the radiating fins is made of a thin plate.

3. The headlamp assembly according to claim 1, further comprising a mount member through which the light source is fixed to the radiating member, and a drive circuit for driving the light source is placed in the mount member.

4. The headlamp assembly according to claim 3, further comprising a plurality of the radiating members, wherein each of the radiating members is fixed onto the surface of the mount member.

5. The headlamp assembly according to claim 3, wherein the drive circuit is placed in the mount member apart from the light source.

6. A headlamp assembly for a motor vehicle comprising:

a housing case, and a front part of the housing case being open;

a lens cover fitted to the front part of the housing case, and the lens cover and the housing case forming a light chamber;

a light source for emitting light placed in the light chamber;

a reflector, placed in the light chamber, for reflecting the light emitted from the light source toward a front direction of the headlamp assembly, the reflector being placed at a rear position of the light source and partially surrounding the light source;

a shade, placed in the light chamber, for cutting off a part of the light reflected by the reflector;

a projection lens, placed in the light chamber, for projecting the light reflected by the reflector toward the front direction of the headlamp assembly through the lens cover;

a radiating member, comprised of a plurality of radiating fins placed in the light chamber at a right angle to a bottom wall side of the housing case, each of the radiating fins having a plate shape, an upper part and a bottom part of each of the radiating fins having a different heat capacity with which a different quantity of heat energy being conducted, and heat energy generated by the light source being radiated through the radiating fins; and the projection lens, the shade, and the light source being arranged in line from the front end of the headlamp assembly along an axial direction of the light source; wherein the radiating member further comprises a vertical plate placed at a right angle to the bottom wall of the housing case, the radiating fins are fixed at a predetermined interval onto a surface of the vertical plate so that the radiating fins are placed in parallel to a direction from the bottom wall to the ceiling wall of the housing case, and a slit is composed of a vertical slit part and an inclined slit part, the vertical slit part is extended from the bottom part toward the upper part of each of the radiating fins, and the inclined slit part is extended from a top part of the vertical slit part toward the upper part of the radiating fin along an inclined direction, the slit causing the bottom part of each of the radiating fins to have a different heat conduction of heat energy.

7. The headlamp assembly according to claim 6, further comprising a mount member through which the light source is fixed to the radiating member, and a drive circuit for driving the light source is placed in the mount member.

8. The headlamp assembly according to claim 7, further comprising a plurality of the radiating members, wherein each of the radiating members is fixed onto the surface of the mount member.

9. The headlamp assembly according to claim 7, wherein the drive circuit is placed in the mount member apart from the light source.

10. A headlamp assembly for a motor vehicle comprising:

a housing case, and a front part of the housing case being open;

a lens cover fitted to the front part of the housing case, and the lens cover and the housing case forming a light chamber;

a light source for emitting light placed in the light chamber;

a reflector, placed in the light chamber, for reflecting the light emitted from the light source toward a front direction of the headlamp assembly, the reflector being placed at a rear position of the light source and partially surrounding the light source;

a shade, placed in the light chamber, for cutting off a part of the light reflected by the reflector;

a projection lens, placed in the light chamber, for projecting the light reflected by the reflector toward the front direction of the headlamp assembly through the lens cover;

a radiating member, comprised of a plurality of radiating fins placed in the light chamber at a right angle to a bottom wall side of the housing case, each of the radiating fins having a plate shape, an upper part and a bottom part of each of the radiating fins having a different heat capacity with which a different quantity of heat energy being conducted, and heat energy generated by the light source being radiated through the radiating fins; and the projection lens, the shade, and the light source being arranged in line from the front end of the headlamp assembly along an axial direction of the light source; wherein the upper part of each of the radiating fins is thicker than the bottom part thereof in order to have a different heat capacity with which a different quantity of heat energy is conducted in the upper part and the bottom part of each of the radiating fins.

11. The headlamp assembly according to claim 10, wherein each of the radiating fins is made of a thin plate, the upper part has a stack structure in which the thin plate is bend 180 degrees and overlapped together so that the upper part is thicker than the bottom part of each of the radiating fins.

12. The headlamp assembly according to claim 10, wherein each of the radiating fins has a difference in level so that the upper part is thicker than the bottom part thereof.

13. The headlamp assembly according to claim 10, further comprising a mount member through which the light source is fixed to the radiating member, and a drive circuit for driving the light source is placed in the mount member.

14. The headlamp assembly according to claim 13, further comprising a plurality of the radiating members, wherein each of the radiating members is fixed onto the surface of the mount member.

15. The headlamp assembly according to claim 13, wherein the drive circuit is placed in the mount member apart from the light source.

* * * * *